United States Patent
Peters et al.

[11] Patent Number: 6,077,061
[45] Date of Patent: Jun. 20, 2000

[54] VANE MOTOR WITH BRAKE

[75] Inventors: Dieter Peters; Peter Krebs, both of Witten, Germany

[73] Assignee: J.D. Neuhaus Hebezeuge GmbH & Co., Germany

[21] Appl. No.: 08/981,948

[22] PCT Filed: Jul. 3, 1996

[86] PCT No.: PCT/EP96/02917

§ 371 Date: Jan. 2, 1998

§ 102(e) Date: Jan. 2, 1998

[87] PCT Pub. No.: WO97/02406

PCT Pub. Date: Jan. 23, 1997

[30] Foreign Application Priority Data

Jul. 4, 1995 [DE] Germany ............... 295 10 799 U

[51] Int. Cl.[7] ................................................. F01C 13/00
[52] U.S. Cl. ........................................ 418/181; 418/259
[58] Field of Search ................................ 418/259, 181

[56] References Cited

U.S. PATENT DOCUMENTS

| | | |
|---|---|---|
| 3,848,716 | 11/1974 | Hanning . |
| 3,883,119 | 5/1975 | Hansson . |
| 3,960,470 | 6/1976 | Kinder ........................ 418/181 X |
| 4,434,974 | 3/1984 | Lacount . |
| 5,658,137 | 8/1997 | Makela ........................ 418/181 X |

FOREIGN PATENT DOCUMENTS

| | | |
|---|---|---|
| 2637321 | 2/1977 | Germany . |
| 95/02762 | 1/1995 | WIPO . |

*Primary Examiner*—Hoang Nguyen
*Attorney, Agent, or Firm*—Snell & Wilmer L.L.P.

[57] ABSTRACT

A vane motor comprises a casing and a vane rotor being mounted in the casing. A friction brake device is arranged in the casing and it is intended for braking, stopping and releasing the vane rotor. At least one of the two end faces of the vane rotor is part of the brake device and forms a friction pair with a braking surface of a brake element of the brake device. The brake element is arranged next to the said end face of the vane rotor and is axially movable upon actuation of the friction brake device for braking, stopping and releasing the vane rotor.

27 Claims, 7 Drawing Sheets

VANE MOTOR WITH BRAKE

The invention relates to a vane motor, comprising a casing and a vane rotor mounted in the casing, having a friction brake device which is arranged in the casing and is intended for braking, stopping and releasing the vane rotor.

Such vane motors have been known for a long time and are preferably operated with compressed air, but also with hydraulic fluid. They are used, for example, in lifting appliances. They have proved to be reliable and robust in everyday operation. In mining, for example, their use is preferred to electric motors, since no separate measures have to be taken for explosion protection.

In general, the vane motor comprises a casing and a vane rotor mounted in the casing. The vane rotor in turn comprises, in addition to a shaft, a rotor body with rotor slots in which individual vanes are mounted so as to be radially displaceable relative to the axis of the vane rotor. The vane rotor itself is arranged in the vane motor in a cylinder liner, the rotary spindle of the vane rotor being arranged eccentrically to the longitudinal center axis of the cylinder liner and being mounted in side disks. In continuous operation, the centrifugal force acting on the vanes and possibly assisted by spring elements ensures that each vane bears against the inner wall of the cylinder liner, so that only minimum leakage losses occur between the narrow running surfaces of the vanes and the inner wall of the cylinder liner. Further leakage losses are caused by gaps at the side faces of the vane rotor and between the outside diameter of the vane rotor and the inside diameter of the cylinder liner.

Furthermore, the vane motor has integrated in its casing a friction brake device, which is provided for braking, stopping and releasing the vane rotor. This friction brake device consists, for example, of a brake disk having at least one brake shoe displaceable against the end faces of the brake disk, the brake disk being arranged with the brake shoe and a cylinder allocated to the brake shoe in a separate space of the casing, and the brake disk being mounted on an extension journal of the rotor shaft.

The brake shoe itself is spring-loaded and designed in such a way that it is more or less in frictional engagement with the brake disk both when the vane motor is stopped and in the start-up phase of the vane motor. To control the braking action of the friction brake device, a further line is provided parallel to a feed passage to the vane rotor for the pressure medium and ends in the space in which the brake cylinder for easing the friction brake device is arranged. By the action of the pressure medium, which is fed to the vane rotor and passes via the additional line into the said brake cylinder, the brake shoe is displaced against the spring force in axial direction, so that the brake disk and thus also the vane rotor—depending on the operating state—are at least partly released. When the action of the pressure medium decreases, the brake shoe comes into contact with the brake disk again, with a corresponding braking action being produced, since the pressure in the said space also decreases.

On account of the complicated and varied components and the interplay between the vane rotor and the friction brake device, it is necessary to produce the individual components very precisely. The manufacturing and assembly costs of the known vane motors are therefore relatively high.

On account of the friction brake device arranged next to the vane rotor in a separate casing chamber, the vane motor itself is of very large dimensions and, since a cast casing is usually used, is also relatively heavy.

The two last-mentioned criteria make the handling of chain hoists more difficult in certain fields of application.

The object of the invention is therefore to provide a vane motor which contains markedly fewer components than the known prior art in order to thus ensure more cost-effective manufacture of such a vane motor. The aim is also to reduce the overall size and weight.

The principle for achieving the set object consists in assigning additional functions to components already present in the vane motor in order to thereby be able to dispense with other components. To this end, provision is made for the side disks, which are normally arranged directly next to the vane rotor, to take over the braking function. Instead of the previous friction brake device in a separate space, a friction brake device is now to be arranged directly next to the vane rotor and is in frictional engagement with at least one of the two end faces of the vane rotor both when the vane motor is stopped and in the start-up phase of the vane motor. The brake device is consequently integrated in the vane rotor.

The achievement of the object is characterized in that at least one (the first) of the two end faces of the vane rotor is part of the friction brake device and forms a friction pair with a braking surface of a brake element, which is arranged next to this first end face and is axially movable for actuating the friction brake device for braking or stopping and releasing the vane rotor.

The construction of the vane motor is considerably simplified by the invention. The weight and space requirement can be markedly reduced. Manufacture and assembly become easier and simpler. The manufacturing costs are considerably reduced.

A further advantage consists in the fact that coarse production tolerances are sufficient. Since the vane motor according to the invention is a "floating" system, the axial position of the vane rotor is self-regulating and therefore automatically compensates for the production tolerances. Possible wear phenomena which occur on account of the rotation in the bearings or other components become partly insignificant as a result.

Furthermore, it is advantageous that the vane motor can be assembled from one side, since the separate casing chamber for the brake device is omitted.

If only one end face of the vane rotor is a part of the brake device by virtue of the fact that one end face of the vane rotor forms a friction pair with the braking surface of the axially displaceable brake element, a stop element fixed to the casing and intended for forming a sliding pair with the other (second) end face can be provided next to the other side of the vane rotor, which stop element has a sliding surface facing this end face. In this case, the braking of the vane rotor is consequently effected only on one side, whereas the second end face having the stop element forms a plain bearing for absorbing in particular axial forces.

Instead of the brake device which acts on one side, however, it is preferable according to the invention for the vane rotor to be axially displaceable, and for a stop element, which is designed like a brake disk and so as to be in a fixed position, to be provided next to the other (second) end face of the vane rotor and to form a second friction pair with the other end face. In this case, both end faces of the vane rotor are included in the brake device, so that a correspondingly increased and uniform braking action results.

The brake element is preferably pressed by the action of a braking force against the braking surface of the first end face of the vane rotor, so that, even though the other end face of the vane rotor is designed as part of the brake device, a corresponding action of the braking force is also obtained on the other side of the vane rotor on account of the axial displaceability of the vane rotor.

In particular in the event of both end faces of the vane rotor being provided as parts of the brake device, in a development according to the invention the vane rotor is designed and arranged in such a way that the axially displaceable brake element is at least partly released from the first end face during the start-up operation of the vane motor by the action of the pressure medium fed to the vane rotor, so that a gap forms between the brake element and the first end face, and the brake device thus at least partly releases the vane rotor. The brake element is brought into contact again with the braking surface of the first end face when the action of the pressure medium decreases. The gap width depends on the drive-medium pressure which acts on the brake element. Consequently, during the start-up of the vane rotor, first of all only a relatively narrow gap forms— the brake element begins to be released from the end face, and, depending on the construction of the vane motor, the other end face of the vane motor is correspondingly released from the braking surface of the stop element—until the gap reaches its operating width under the action of the full operating pressure of the drive medium, and the two end faces of the vane rotor run free. Conversely, the gap on both sides of the vane rotor is reduced again, until the vane rotor stops, when the pressure of the drive medium correspondingly decreases.

If a separate brake device is provided next to each of the two end faces of the vane rotor, the corresponding further brake element on the other side of the vane rotor is axially displaced accordingly to form the gap and likewise under the action of the pressure of the drive medium.

The brake elements can preferably be pressed by the action of a braking force against the braking surface of the first end face of the vane rotor or, in the case of a second brake device, against the braking surfaces of the two end faces of the vane rotor, the braking force expediently being produced mechanically by means of spring elements.

The brake elements as well as the stop element are preferably made of brake-lining material. As an alternative, sintered metal is also conceivable.

So that the pressure space of the vane rotor still remains sealed off fluidically from its environment, provision is made as a development according to the invention for both the brake element of the braking devices and the stop element to be provided with annular seals arranged on their circumference.

A very important development of the invention consists in the fact that a piston ring, which is arranged in the brake element, specifically on the side remote from the corresponding end face of the vane rotor, is connected both to adjusting screws and to the spring elements producing the braking force, the spring force of the spring elements being varied by means of the adjusting screws. The adjusting screws allow the braking force to be adjusted and likewise also readjusted in a very simple manner without the casing having to be opened for this purpose.

An especially important development of the invention consists in the fact that at least one of the two bearings of the vane rotor is arranged directly in the brake element and therefore, contrary to the previous type of construction, participates together with the brake element in the axial displacements which result during operation of the vane motor.

A further advantageous refinement consists in the fact that the casing of the vane motor does not have a separate cylinder liner for encasing the vane rotor, but the cylinder liner and casing of the vane motor are formed in one piece. The manufacturing costs of such a vane rotor are thereby further reduced, especially as production tolerances of the inner surface of the cylinder liner are mostly compensated for on account of the radially displaceable vanes.

In a further exemplary embodiment of a vane motor, part of a drive casing, which is preferably provided for a chain drive, is advantageously integrated in the casing of the vane motor. In this case, the casing for the chain drive and the casing for the vane motor are formed in one piece and thus result in a compact type of construction.

In a further exemplary embodiment, the casing of the vane motor is completely connected to that of the chain drive, receptacles for load hook and chain sprocket being provided in the casing for the chain drive.

Further advantageous refinements can be found in the following description and in the subclaims.

Several exemplary embodiments of the invention are explained in more detail below and are shown in the drawings, in which.

Figure 1:
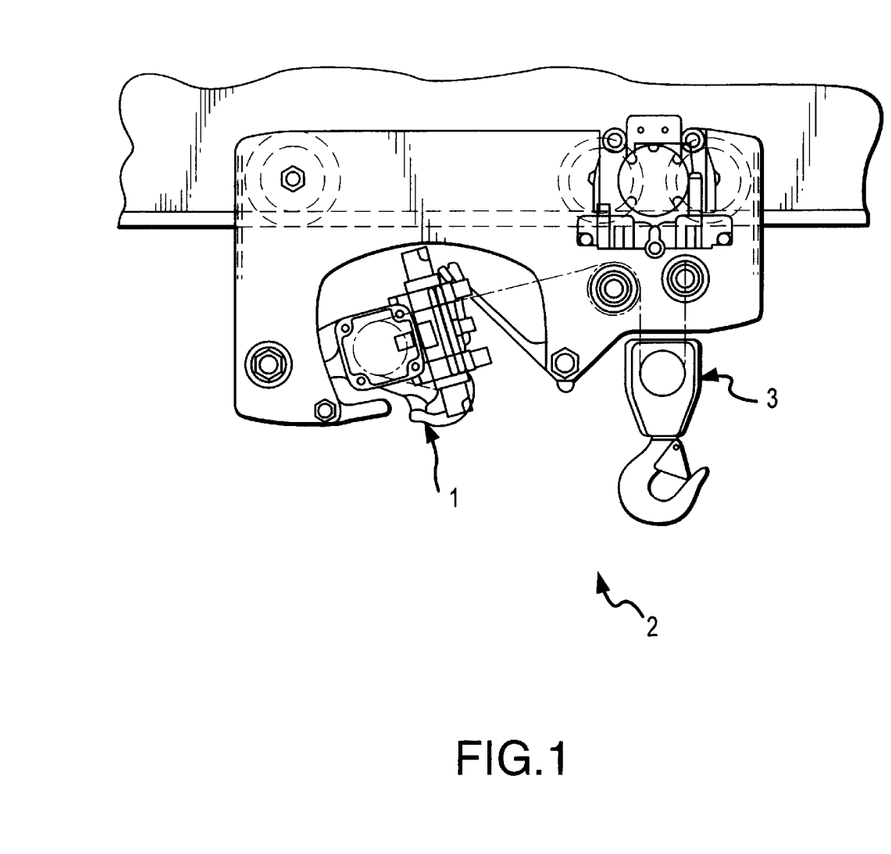
FIG. 1 shows an example of application of a vane motor for a lifting appliance, arranged on a traveling crab, in side view.
Figure 2:
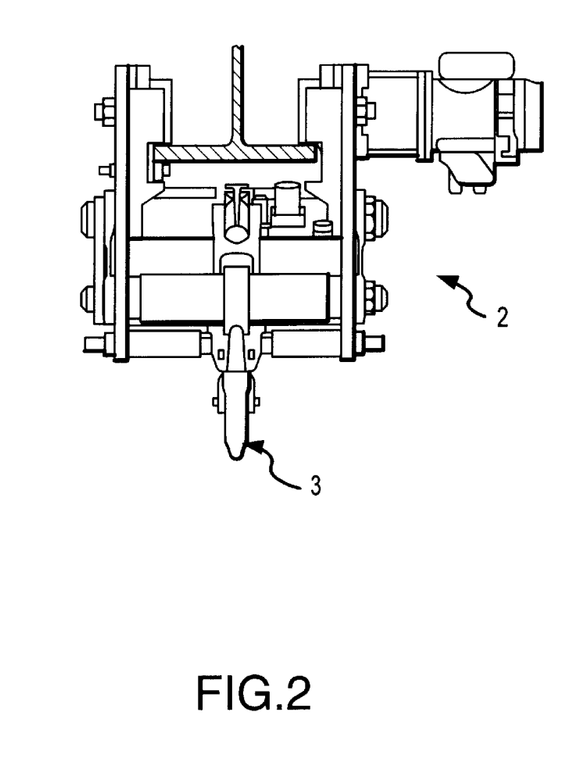
FIG. 2 shows a rear view of the traveling crab in FIG. 1.

An application of a vane motor 1 according to the invention is shown in FIGS. 1 and 2. The vane motor 1 is fitted into a traveling crab 2, the vane motor 1 being allocated as a drive to a lifting and lowering device 3. The vane motor 1 and the lifting and lowering device 3 are connected via a chain drive. However, it is also possible for the same vane motor to be used for the travel drive of the traveling crab 2 as well.

The vane motor 1 (FIGS. 3 to 8) essentially comprises a casing 4, a vane rotor 5 arranged in the casing 4, and a brake device 10.

Figure 3:
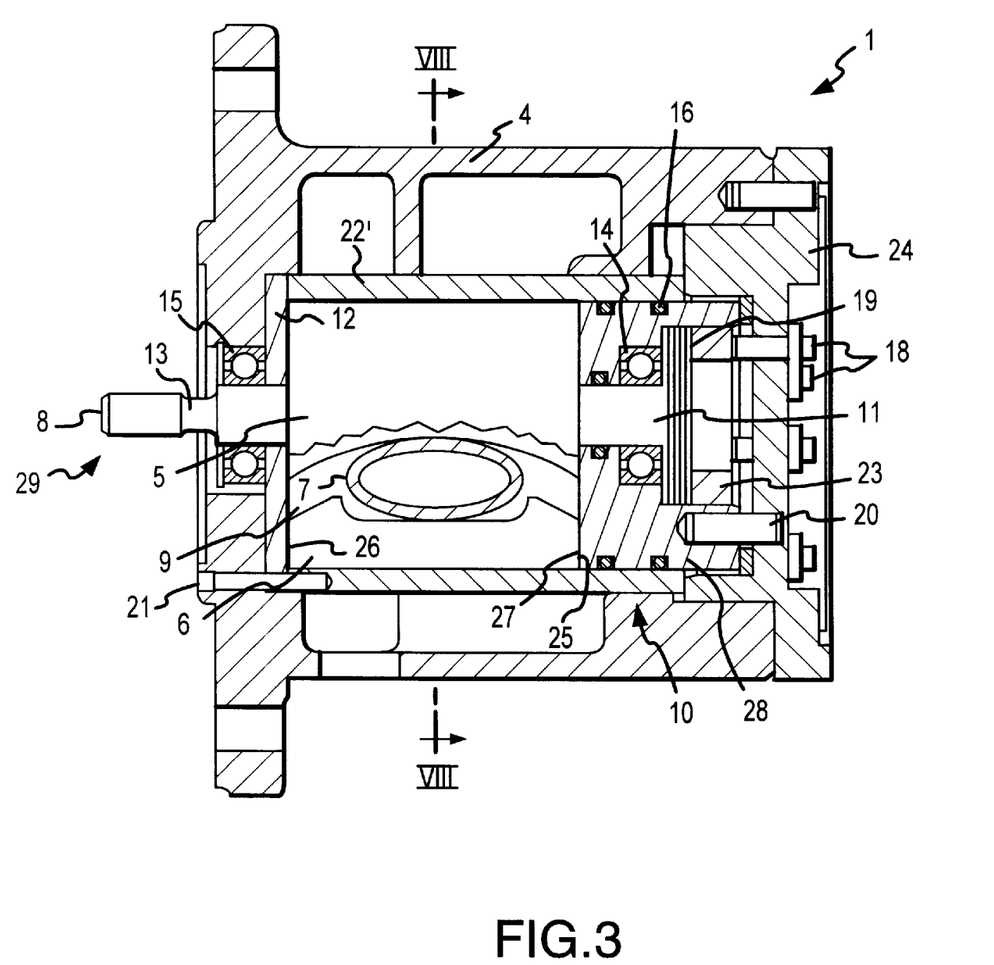
FIG. 3 shows a sectional view of a first exemplary embodiment of a vane motor having a cylinder liner.
Figure 4:
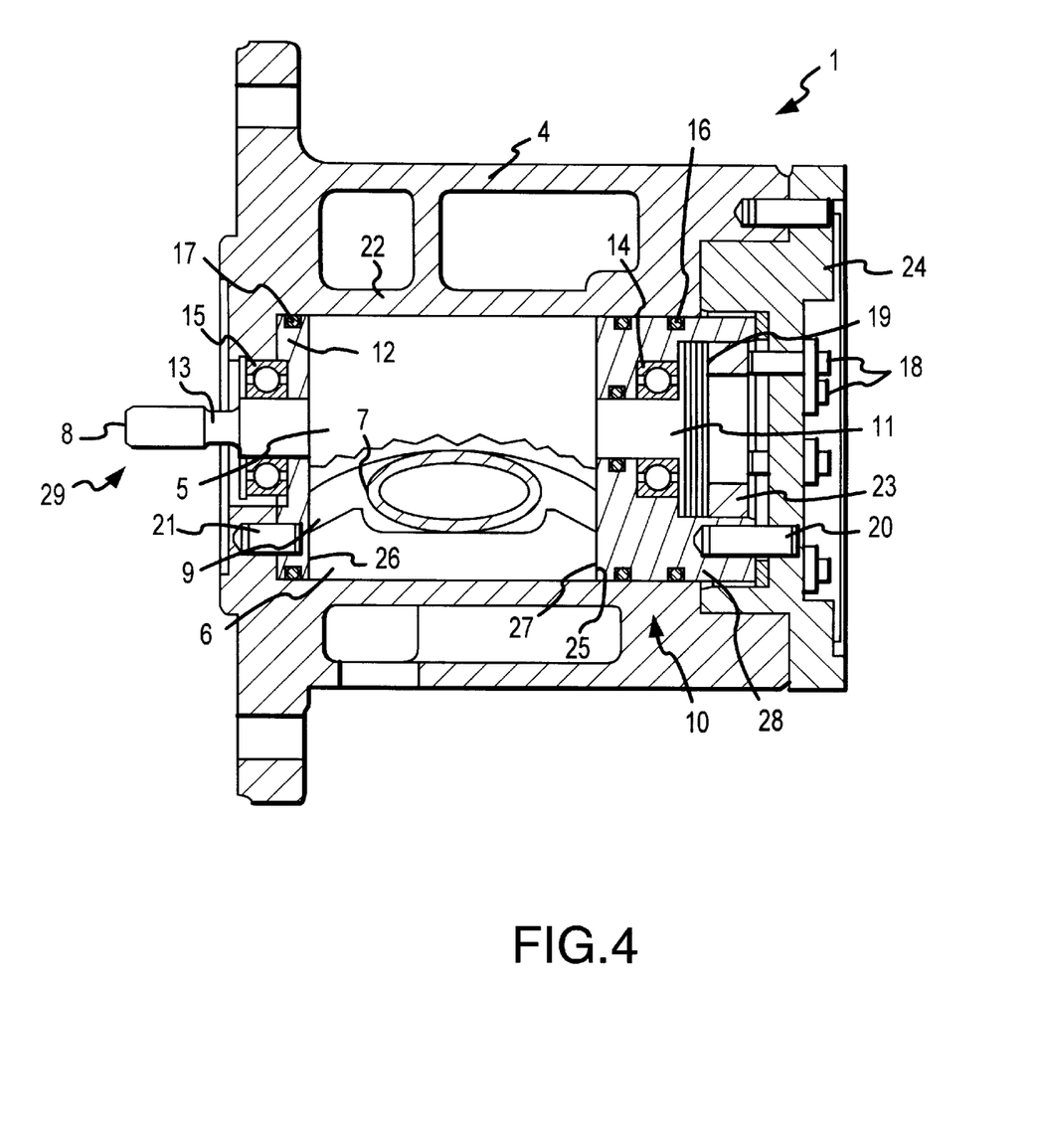
FIG. 4 shows a sectional view of a second exemplary embodiment of a vane motor, the cylinder liner being an integral part of the casing.
Figure 7:
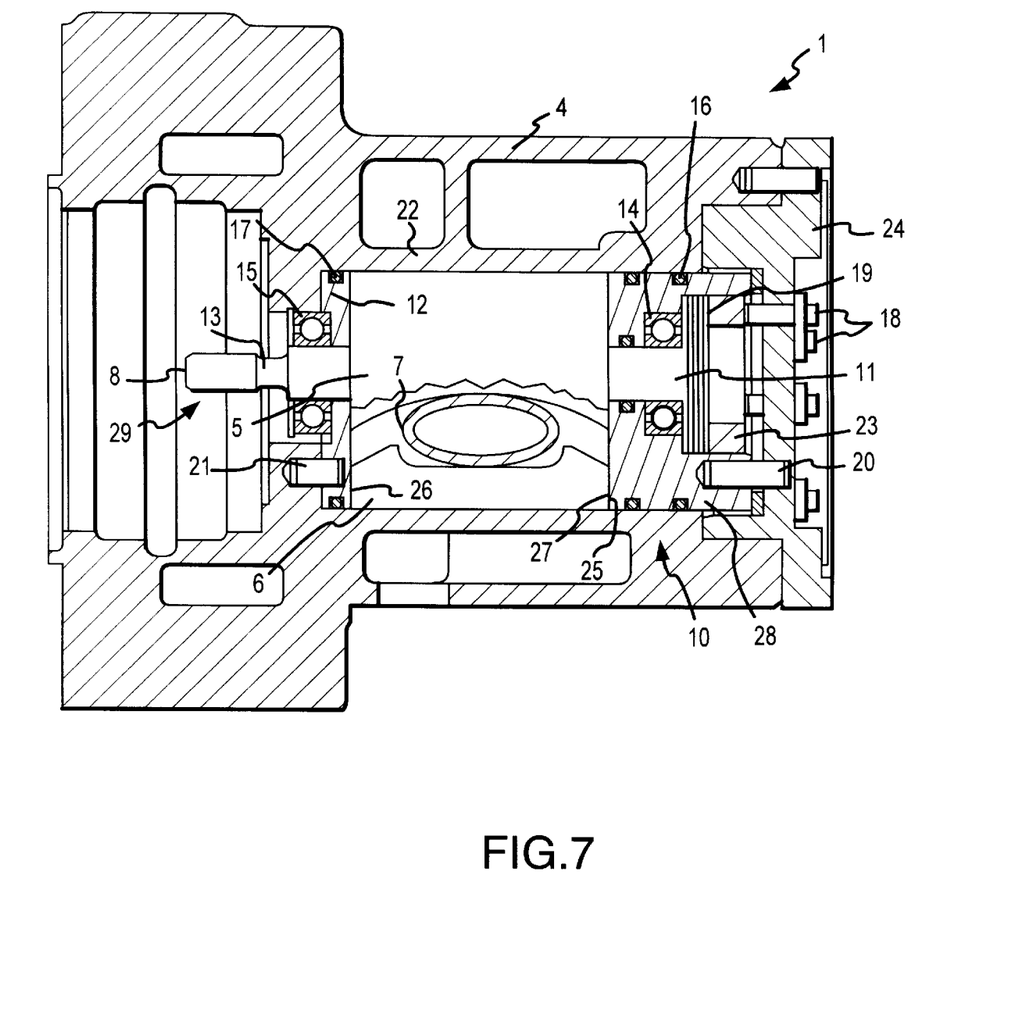
FIG. 7 shows a sectional representation of a fifth exemplary embodiment of a vane motor having, compared with FIG. 5, a complete casing for a chain drive and the load-hook receptacle.
Figure 8:
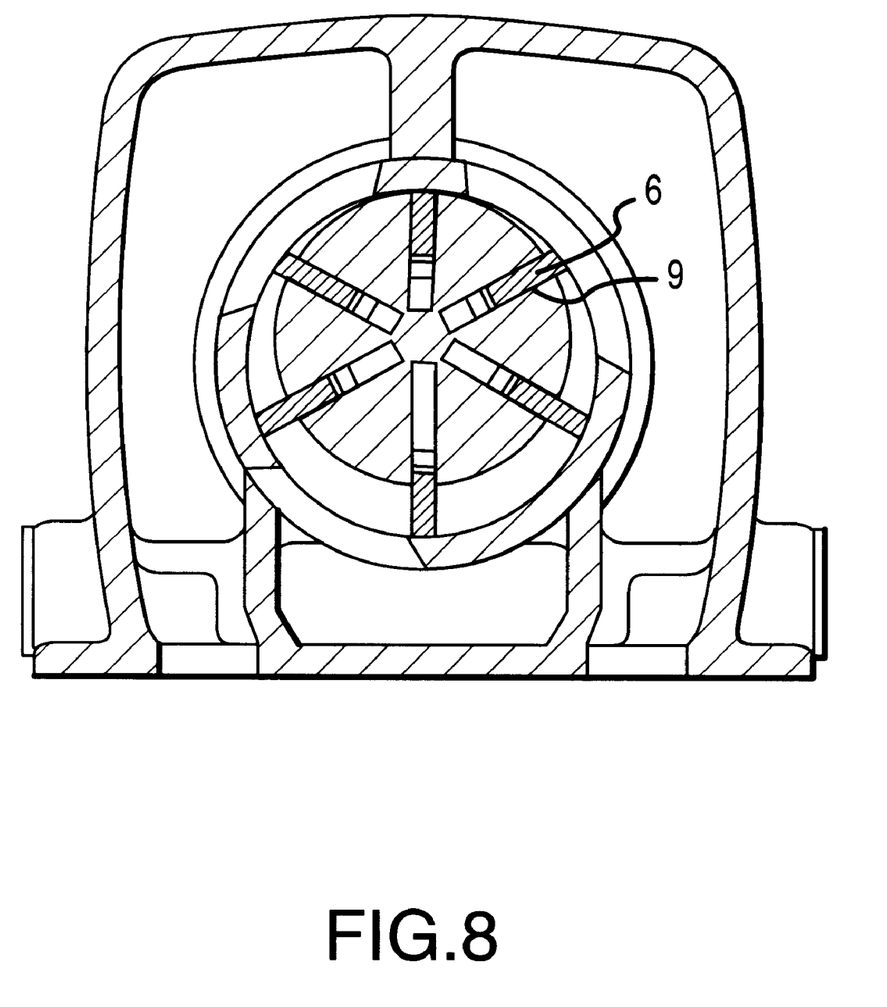
FIG. 8 shows a cross-sectional view of the vane motor according to FIG. 3.

The casing 4 itself is preferably made of gray iron, a cylinder liner 22' made of a different material being made in the interior of the casing 4 (FIGS. 3, 8). The casing 4 is preferably configured in such a way that the cylinder liner 22 and the casing 4 are formed in one piece and can therefore be produced in one manufacturing step (FIGS. 4 to 7).

The vane rotor 5 comprises a rotor body and bearing journals 11, 13 projecting on both sides of the rotor body. A drive pinion or a coupling tooth system 8 is additionally provided on one bearing journal 13. Both bearing journals 11, 13 form the shaft 29 of the vane rotor 5, which in the assembled state is arranged eccentrically to the axis of rotation of the cylinder liner 22, 22'.

The rotor body of the vane rotor 5 has rotor slots 9 in which the vanes 6 are radially displaceably and elastically mounted.

The casing 4 of the vane motor 1 is configured in such a way that all the components required for the vane rotor 5 can be inserted into the interior of the casing 4 from one side. On the drive side of the vane motor 1, first of all a bearing 15 for the further bearing journal 13 together with its drive pinion 8 is to be put into the casing, and a stop element 12, which is made of brake material, is to be inserted. On its circumference, the stop element 12 has an annular seal 17, which seals off the interior of the vane rotor 5 from its environment. A pin 21 is provided for simple insertion of the stop element 12 in an accurate position, which pin 21 is inserted into a bore in the casing before the stop element 12 is put in, so that at least part of the pin 21 protrudes and engages in a bore in the stop element 12 in the assembled state in order to prevent rotation of the stop element 12 during the rotary motion of the vane rotor 5.

By means of a fitting device (not shown in the drawing), the vane rotor 5 together with the vanes 6, which are elastically mounted, is inserted into the casing 4 and is pushed through the stop element 12 and the further bearing 15, so that the drive pinion 8, as shown, projects from the casing 4 of the vane motor 1, and an end face 26 of the vane rotor 5 bears against the braking surface of the stop element 12.

The brake device 10 essentially comprises a brake element 28 having a braking surface 27, a bearing 14 arranged in the brake element 28, and a spring element 19 acting directly on the brake element 28. In this case, the brake element 28 is made of brake-lining material. As an alternative, provision is made for the brake-lining material to be attached to a backing element which can be manufactured cost-effectively. However, it is also possible for the brake element 28 to be made of sintered metal or for only the side facing the vane rotor to be made of sintered metal.

To assemble the brake device 10, the brake element 28 is preassembled by annular seals 16 being inserted in grooves in the circumferential surface of the brake element 28. Furthermore, an annular seal which is provided for accommodating the bearing journal 11 of the shaft 29 of the vane rotor 5 is inserted into the bore in the brake element 28. A bearing 14 which is arranged in a recess in the brake element 28 is provided for accommodating the bearing journal 11. Acting on the end face of the brake element 28 remote from the vane rotor 5 is the spring element 19, which preferably consists of disk springs, which bear against a piston ring 23, which can be displaced by means of adjusting screws 18, so that the spring force of the spring element 19 and thus the braking force can be adjusted. A pin 20, which is arranged in a casing lid 24 and engages in the brake device 10 in the assembled state thereof, is provided in order to prevent rotation of the brake element 28 in the casing. This casing lid 24 is arranged on an end face of the casing 4, closes off the casing interior and accommodates the adjusting screws 18 just described.

Mode of operation:

When the vane motor 1 is stopped, the brake element 28 of the brake device 10 is in frictional engagement with the vane rotor 5, as shown in FIGS. 3–7, and thus secures the vane rotor 5 in position.

When pressure medium flows into the pressure space of the vane rotor 5, in order to effect the start-up and the rotation of the vane rotor 5, an axial displacement of the brake element 28 against the spring force of the spring element 19 produces, on account of the pressure at the end faces of the vane intermediate spaces, in each case filled with pressure medium, a gap between the brake element 28 together with its braking surface 27 and the one end face 25 of the vane rotor. During the start-up phase, however, the one end face 25 of the vane rotor remains partly in (sliding) contact with the brake element 28, and the other end face 26 of the vane rotor 5 likewise continues to form a friction pair with the stop element 12.

If the operating pressure between the vanes of the vane rotor 5 continues to increase, the gap between the brake element 28 and the one end face 25 of the vane rotor 5—as well as the gap on the other side—increases until the brake element 28 and also the stop element 12 are no longer in frictional engagement with the vane rotor 5. The vane rotor 5 now rotates in an "axially floating" manner between the braking surfaces of the stop element 12 and the brake element 28.

If the pressure of the pressure medium decreases again, the gap width decreases accordingly, and contact again occurs between the brake element 28 and the one end face 25 of the vane rotor 5 on the one side as well as between the other end face 26 and the braking surface of the stop element 12 on the other side of the vane rotor 5.

By adjustment of the spring element 19 which acts on the brake element 28, the braking force which is exerted on the vane rotor 5 can be adjusted in such a way that the vane rotor 5 can always be reliably secured in position and at the same time unhindered start-up and operation of the vane motor is possible.

It is possible for a further brake device of the type shown in FIGS. 3–8 to be arranged on the other end face 26 of the vane rotor 5, so that a direct brake opening movement occurs at both sides of the vane rotor 5.

Figure 5:
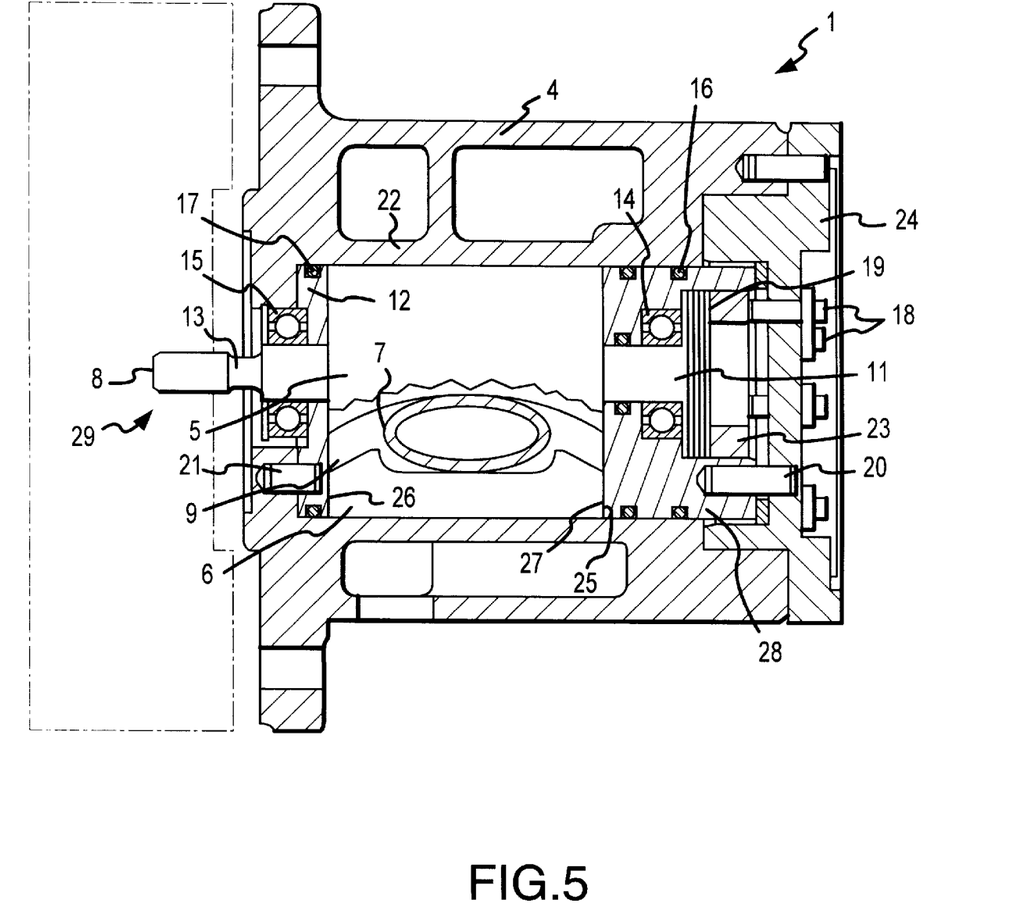
FIG. 5 shows a sectional view of a third exemplary embodiment of a vane motor in combination with an alternative supplementary drive (shown by chain-dotted line)

In the exemplary embodiment shown in FIG. 5, an alternative supplementary drive (shown by chain-dotted line) is provided at the vane motor on the drive side and can be directly flange-mounted on the casing 4.

Figure 6:
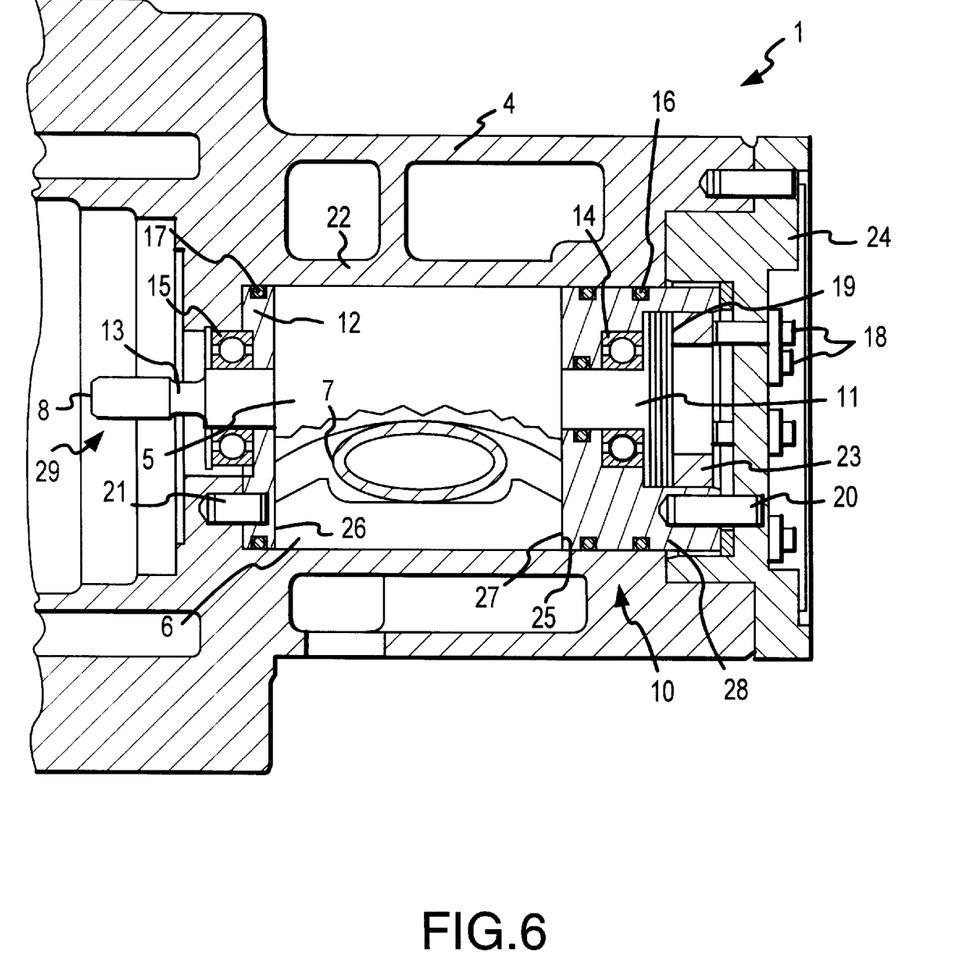
FIG. 6 shows a sectional view of a fourth exemplary embodiment of a vane motor having a part of a casing for a chain drive.

In the exemplary embodiments according to FIGS. 6 and 7, a partial casing or a complete casing respectively is provided for a chain drive and is formed as a compact unit in one piece with the casing 4 of the vane motor 1.

Since the vane motor according to the invention is of simple construction and can therefore be manufactured cost effectively, a motor which can be used in a variety of ways has been created, especially as the principle for achieving the object of the invention can readily be applied to pneumatic or hydraulic vane motors and likewise to gear motors. It is essential in this case that the rotational speed of the vane motor can also be regulated in small steps under load by the simultaneous and direct admission of pressure medium to the vane rotor and the brake element.

We claim:

1. Vane motor, comprising a casing and a vane rotor mounted in the casing, having a friction brake device which is arranged in the casing and is intended for braking, stopping and releasing the vane rotor, characterized in that the first of the two end faces (25, 26) of the vane rotor (5) is part of the brake device (10) and forms a friction pair with a braking surface (27) of a brake element (28), which is arranged next to this end face (25 or 26) and is axially movable upon actuation of the friction brake device for braking, stopping and releasing the vane rotor (5).

2. Vane motor according to claim 1, characterized in that a stop element (12) fixed to the casing and intended for forming a sliding pair with the second end face (26) has a sliding surface, facing the end face (26), or an axial bearing.

3. Vane motor according to claim 1, characterized in that the vane rotor (5) is axially displaceable, and a stop element (12), which is designed as a brake disk and so as to be in a fixed position and has a braking surface, is provided next to the second end face (26) of the vane rotor (5) and forms a second friction pair with the other end face (26).

4. Vane motor according to claim 1, characterized in that the brake element (28) can be pressed by the action of a braking force against the braking surface.

5. Vane motor according to claim 1, characterized in that a further brake element is provided instead of the stop element (12), which brake element is axially displaceable and is an integral part of a further brake device and can also be pressed by the action of a braking force against the braking surface of the second end face (26) of the vane rotor (5).

6. Vane motor according to claim 1, characterized in that the brake element (28) is at least partly released from the first end face (25) during the start-up operation of the vane motor (1) by the action of the pressure medium fed to the vane rotor (5), so that a gap forms between the brake element (28) and the first end face (25), and the brake device (10) thus at least partly releases the vane rotor (5), and in that the brake element (28) is brought into contact again with the braking surface (27) of the first end face (25) by the braking force when the action of the pressure medium decreases.

7. Vane motor according to claim 5, characterized in that said further brake element is at least partly released from the second end face (26) during the start-up operation of the vane motor (1) by the action of the pressure medium fed to the vane rotor (5), so that a gap forms between said further brake element and the second end face (26), and said further brake element thus at least partly releases the vane rotor (5), and in that said further brake element is brought into contact again with the braking surface of the second end face (26) by the braking force when the action of the pressure medium decreases.

8. Vane motor according to claim 1, characterized in that the brake element (28) of the brake device (10) is made of brake-lining material.

9. Vane motor according to claim 3, characterized in that the stop element (12) is made of brake-lining material.

10. Vane motor according to claim 1, characterized in that the brake element (28) comprises a backing element and a disk, the disk being attached to the backing element on the side facing the vane rotor (5).

11. Vane motor according to claim 10, characterized in that the disk is made of brake-lining material.

12. Vane motor according to claim 10, characterized in that the disk is made of sintered metal.

13. Vane motor according to claim 3, characterized in that the stop element (12) comprises a backing element and a disk, the disk being attached to the backing element on the side facing the vane rotor (5).

14. Vane motor according to claim 13, characterized in that the disk is made of brake-lining material.

15. Vane motor according to claim 13, characterized in that the disk is made of sintered metal.

16. Vane motor according to claim 1, characterized in that the brake device (10) contains spring elements (19) which act on the brake element (28).

17. Vane motor according to claim 16, characterized in that a piston ring (23), which is arranged in the brake element 28, is connected both to adjusting screws (18) or a threaded sleeve and to the spring elements (19), the spring force of the spring elements (19) being varied by means of the adjusting screws or the threaded sleeve (18).

18. Vane motor according to claim 1, characterized in that the vane rotor (5) runs in two bearings (14, 15), one bearing (14) being arranged directly in the brake element (28).

19. Vane motor according to claim 2, characterized in that the vane rotor (5) runs in two bearings (14, 15), one bearing (15) of the vane rotor (5) being arranged directly in the stop element (12) of disk-like design or in the casing (4) or in the further brake element if the stop element (12) is replaced by a further brake element.

20. Vane motor according to claim 2, characterized in that both the brake element (28) of the brake devices (10) and the stop element (12) are provided with annular seals (16, 17) which are arranged on their circumference and fluidically seal off the space of the vane rotor (5) from its environment.

21. Vane motor according to claim 1, characterized in that a cylinder liner (22) which is connected to the casing (4) surrounds the vane rotor (5).

22. Vane motor according to claim 1, characterized in that a cylindrical bore for accommodating the vane rotor (5) is formed to the casing (4).

23. Vane motor according to claim 1, characterized in that the vane motor (1) can be operated hydraulically.

24. Vane motor according to claim 1, characterized in that the vane motor (1) can be operated pneumatically.

25. Vane motor according to claim 1, characterized in that a gear motor is provided instead of the vane motor.

26. A vane motor, comprising:
   a casing, a vane rotor mounted in the casing, said vane rotor having at least one end face, and a friction brake device arranged in the casing for braking, stopping and releasing said vane rotor, and
   wherein at least one of said at least one end face of said vane rotor is part of said brake device and forms a friction pair with a braking surface of a brake device, arranged next to said end face, and
   wherein said brake device is axially movable upon activating said friction brake device.

27. The vane motor according to claim 26, wherein said vane rotor includes a first end face and a second end face, said first end face forming friction pair with said brake element, and said second end face forms a sliding pair with a stop element fixed to said casing, said sliding pair having a sliding surface.

* * * * *